(12) United States Patent
Khan

(10) Patent No.: US 12,330,996 B2
(45) Date of Patent: Jun. 17, 2025

(54) HIGH TEMPERATURE OXIDATION PROTECTION FOR CARBON-CARBON COMPOSITES

(71) Applicant: Goodrich Corporation, Charlotte, NC (US)

(72) Inventor: Atta Khan, Colorado Springs, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 785 days.

(21) Appl. No.: 17/308,776

(22) Filed: May 5, 2021

(65) Prior Publication Data
US 2022/0356123 A1 Nov. 10, 2022

(51) Int. Cl.
C04B 41/50 (2006.01)
C04B 41/89 (2006.01)
(Continued)

(52) U.S. Cl.
CPC ...... *C04B 41/5031* (2013.01); *C04B 41/5006* (2013.01); *C04B 41/5035* (2013.01); *C04B 41/5058* (2013.01); *C04B 41/5059* (2013.01); *C04B 41/5066* (2013.01); *C04B 41/89* (2013.01); *C04B 35/83* (2013.01); *C04B 41/5023* (2013.01); *C04B 2111/00362* (2013.01); *C04B 2111/00982* (2013.01)

(58) Field of Classification Search
CPC . C04B 41/50; C04B 41/5059; C04B 41/5063; C04B 41/5066; C04B 41/89; C04B 2111/00362
See application file for complete search history.

(56) References Cited

U.S. PATENT DOCUMENTS

| 2,685,539 A | 8/1954 | Woodburn, Jr. et al. |
| 2,685,540 A | 8/1954 | Woodburn, Jr. et al. |

(Continued)

FOREIGN PATENT DOCUMENTS

| CN | 1046517 | 10/1990 |
| CN | 101233341 | 7/2008 |

(Continued)

OTHER PUBLICATIONS

USPTO, Final Office Action dated Aug. 22, 2022 in U.S. Appl. No. 16/029,134.
(Continued)

*Primary Examiner* — Nathan H Empie
(74) *Attorney, Agent, or Firm* — SNELL & WILMER L.L.P.

(57) ABSTRACT

A method for forming an oxidation protection system on a composite structure is provided, which may comprise applying a ceramic layer slurry to the composite structure, wherein the ceramic layer slurry may comprise aluminum and silicon in a solvent or carrier fluid; heating the composite structure to form a ceramic layer on the composite structure, wherein the ceramic layer may comprise aluminum nitride; applying a sealing slurry to the composite structure, wherein the sealing slurry may comprise a sealing pre-slurry composition and a sealing carrier fluid, wherein the sealing pre-slurry composition may comprise a sealing phosphate glass composition; and/or heating the composite structure to form a sealing layer on the composite structure.

12 Claims, 7 Drawing Sheets

(51) Int. Cl.
C04B 35/83 (2006.01)
C04B 111/00 (2006.01)

(56) References Cited

U.S. PATENT DOCUMENTS

| | | | |
|---|---|---|---|
| 2,685,541 A | 8/1954 | Woodburn, Jr. et al. | |
| 2,685,542 A | 8/1954 | Woodburn, Jr. et al. | |
| 2,989,153 A | 6/1961 | Boulet et al. | |
| 3,342,627 A | 9/1967 | Paxton et al. | |
| 3,510,347 A | 5/1970 | Strater | |
| 3,692,150 A | 9/1972 | Ruppe, Jr. | |
| 3,713,882 A | 1/1973 | DeBrunner et al. | |
| 3,794,509 A | 2/1974 | Trauger et al. | |
| 3,972,395 A | 8/1976 | Jannasch et al. | |
| 4,290,510 A | 9/1981 | Warren | |
| 4,330,572 A | 5/1982 | Frosch et al. | |
| 4,332,856 A | 6/1982 | Hsu | |
| 4,425,407 A | 1/1984 | Galasso et al. | |
| 4,439,491 A | 3/1984 | Wilson | |
| 4,454,193 A | 6/1984 | Block | |
| 4,471,023 A | 9/1984 | Shuford | |
| 4,500,602 A | 2/1985 | Patten et al. | |
| 4,548,957 A | 10/1985 | Hucke | |
| 4,567,103 A * | 1/1986 | Sara .................... | C04B 41/5089 313/355 |
| 4,599,256 A | 7/1986 | Vasilos | |
| 4,617,232 A | 10/1986 | Chandler et al. | |
| 4,621,017 A | 11/1986 | Chandler et al. | |
| 4,663,060 A | 5/1987 | Holinski | |
| 4,702,960 A | 10/1987 | Ogman | |
| 4,711,666 A | 12/1987 | Chapman et al. | |
| 4,726,995 A | 2/1988 | Chiu | |
| 4,760,900 A | 8/1988 | Shima et al. | |
| 4,808,558 A * | 2/1989 | Park .................... | C04B 38/0025 501/153 |
| 4,837,073 A | 6/1989 | McAllister et al. | |
| 4,863,001 A | 9/1989 | Edmisten | |
| 4,892,790 A | 1/1990 | Gray | |
| 4,958,998 A | 9/1990 | Yamauchi et al. | |
| 4,960,817 A | 10/1990 | Spadafora | |
| 5,073,454 A | 12/1991 | Graham | |
| 5,077,130 A | 12/1991 | Okuyama et al. | |
| 5,094,901 A | 3/1992 | Gray | |
| 5,102,698 A | 4/1992 | Cavalier et al. | |
| 5,153,070 A | 10/1992 | Andrus et al. | |
| 5,179,048 A | 1/1993 | Niebylski et al. | |
| 5,198,152 A | 3/1993 | Liimatta et al. | |
| 5,215,563 A | 6/1993 | LaCourse et al. | |
| 5,224,572 A | 7/1993 | Smolen et al. | |
| 5,242,746 A | 9/1993 | Bommier et al. | |
| 5,256,448 A | 10/1993 | De Castro | |
| 5,273,819 A | 12/1993 | Jex | |
| 5,298,311 A | 3/1994 | Bentson et al. | |
| 5,324,541 A | 6/1994 | Shuford | |
| 5,352,494 A * | 10/1994 | Rousseau ............... | C04B 41/89 427/419.7 |
| 5,360,638 A | 11/1994 | Lequertier | |
| 5,401,440 A | 3/1995 | Stover et al. | |
| 5,427,823 A | 6/1995 | Varshney et al. | |
| 5,439,080 A | 8/1995 | Haneda et al. | |
| 5,480,676 A | 1/1996 | Sonuparlak et al. | |
| 5,501,306 A | 3/1996 | Martino | |
| 5,518,683 A | 5/1996 | Taylor et al. | |
| 5,518,816 A | 5/1996 | Shuford | |
| 5,536,574 A | 7/1996 | Carter | |
| 5,622,751 A | 4/1997 | Thebault et al. | |
| 5,629,101 A | 5/1997 | Watremez | |
| 5,643,663 A | 7/1997 | Bommier et al. | |
| 5,682,596 A | 10/1997 | Taylor et al. | |
| 5,686,144 A | 11/1997 | Thebault et al. | |
| 5,714,244 A * | 2/1998 | Delaval ................ | C04B 41/009 427/376.1 |
| 5,725,955 A | 3/1998 | Tawil et al. | |
| 5,759,622 A | 6/1998 | Stover | |
| 5,856,015 A | 1/1999 | Buchanan | |
| 5,871,820 A | 2/1999 | Hasz et al. | |
| 5,878,843 A | 3/1999 | Saum | |
| 5,878,849 A | 3/1999 | Prunier, Jr. et al. | |
| 5,901,818 A | 5/1999 | Martino | |
| 5,958,846 A | 9/1999 | Geriner | |
| 5,965,266 A | 10/1999 | Goujard et al. | |
| 5,971,113 A | 10/1999 | Kesavan et al. | |
| 5,981,072 A | 11/1999 | Mercuri et al. | |
| 6,016,450 A | 1/2000 | Corck | |
| 6,036,762 A | 3/2000 | Sambasivan | |
| 6,071,603 A | 6/2000 | Sakai et al. | |
| 6,071,615 A | 6/2000 | Solow et al. | |
| 6,225,248 B1 | 5/2001 | Leiser et al. | |
| 6,228,453 B1 * | 5/2001 | Fareed ............... | C04B 35/62844 428/549 |
| 6,331,362 B1 | 12/2001 | Dupel et al. | |
| 6,346,331 B2 | 2/2002 | Harvey et al. | |
| 6,460,374 B2 | 10/2002 | Sakai et al. | |
| 6,461,415 B1 | 10/2002 | Sambasivan et al. | |
| 6,497,307 B1 | 12/2002 | Schoo et al. | |
| 6,551,701 B1 | 4/2003 | Nohr et al. | |
| 6,551,709 B1 | 4/2003 | Stover | |
| 6,555,173 B1 | 4/2003 | Forsythe et al. | |
| 6,632,762 B1 | 10/2003 | Zaykoski et al. | |
| 6,668,984 B2 | 12/2003 | Gray | |
| 6,676,887 B2 | 1/2004 | Lafdi | |
| 6,737,120 B1 | 5/2004 | Golecki | |
| 6,740,408 B2 | 5/2004 | Thebault | |
| 6,759,117 B2 | 7/2004 | Bauer et al. | |
| 6,884,467 B2 | 4/2005 | Walker et al. | |
| 6,896,968 B2 | 5/2005 | Golecki | |
| 6,913,821 B2 | 7/2005 | Golecki et al. | |
| 6,969,422 B2 | 11/2005 | Mazany et al. | |
| 7,011,888 B2 | 3/2006 | Bauer et al. | |
| 7,118,805 B2 | 10/2006 | Walker et al. | |
| 7,160,618 B2 | 1/2007 | Walker et al. | |
| 7,311,944 B2 | 12/2007 | Sambasivan et al. | |
| 7,501,181 B2 | 3/2009 | Walker et al. | |
| 7,641,941 B2 | 1/2010 | Mazany et al. | |
| 7,732,358 B2 | 6/2010 | Mazany et al. | |
| 7,785,712 B2 | 8/2010 | Miller et al. | |
| 7,938,877 B2 | 5/2011 | Liu et al. | |
| 7,968,192 B2 | 6/2011 | Mazany et al. | |
| 8,021,474 B2 | 9/2011 | Mazany et al. | |
| 8,021,758 B2 | 9/2011 | Sambasivan et al. | |
| 8,124,184 B2 | 2/2012 | Sambasivan et al. | |
| 8,137,802 B1 | 3/2012 | Loehman et al. | |
| 8,322,754 B2 | 12/2012 | Carcagno et al. | |
| 8,962,083 B2 | 2/2015 | Murphy | |
| 9,126,873 B2 | 9/2015 | Diss et al. | |
| 9,388,087 B2 | 7/2016 | Don | |
| 9,657,409 B2 | 5/2017 | Sandgren et al. | |
| 9,758,678 B2 | 9/2017 | Nicolaus et al. | |
| 9,790,133 B2 | 10/2017 | Mazany | |
| 10,508,206 B2 | 12/2019 | Poteet | |
| 10,526,253 B2 | 1/2020 | Poteet | |
| 10,767,059 B2 | 9/2020 | Poteet | |
| 10,941,486 B2 | 3/2021 | Mazany | |
| 11,001,533 B2 | 5/2021 | Mazany et al. | |
| 11,046,619 B2 | 6/2021 | Poteet | |
| 11,072,565 B2 | 7/2021 | Weaver et al. | |
| 11,091,402 B2 | 8/2021 | Poteet | |
| 2002/0058576 A1 | 5/2002 | Mazany et al. | |
| 2002/0096407 A1 | 7/2002 | Gray | |
| 2002/0123592 A1 | 9/2002 | Zhang | |
| 2003/0021975 A1 | 1/2003 | Martin | |
| 2003/0143436 A1 | 7/2003 | Forsythe et al. | |
| 2003/0194574 A1 | 10/2003 | Thebault et al. | |
| 2004/0038032 A1 | 2/2004 | Walker et al. | |
| 2004/0038043 A1 | 2/2004 | Golecki | |
| 2004/0062009 A1 | 4/2004 | Osanai et al. | |
| 2004/0213906 A1 | 10/2004 | Mazany et al. | |
| 2005/0022698 A1 | 2/2005 | Mazany et al. | |
| 2005/0127146 A1 | 6/2005 | Chaumat et al. | |
| 2006/0159909 A1 | 7/2006 | Asian | |
| 2007/0026153 A1 | 2/2007 | Nicolaus et al. | |
| 2007/0154712 A1 | 7/2007 | Mazany et al. | |
| 2008/0058193 A1 | 3/2008 | Drake et al. | |
| 2008/0142148 A1 | 6/2008 | Mazany | |

(56) References Cited

U.S. PATENT DOCUMENTS

| | | |
|---|---|---|
| 2008/0311301 A1 | 12/2008 | Diss et al. |
| 2010/0044730 A1 | 2/2010 | Kwon et al. |
| 2010/0266770 A1 | 10/2010 | Mazany et al. |
| 2011/0311804 A1 | 12/2011 | Diss |
| 2012/0025434 A1 | 2/2012 | Demey et al. |
| 2013/0022826 A1 | 1/2013 | Kmetz |
| 2014/0196502 A1 | 7/2014 | Masuda |
| 2014/0227511 A1 | 8/2014 | Mazany |
| 2014/0349016 A1 | 11/2014 | Don |
| 2015/0183998 A1 | 7/2015 | Belov et al. |
| 2015/0291805 A1 | 10/2015 | Nicolaus et al. |
| 2015/0362029 A1 | 12/2015 | Edwards et al. |
| 2016/0122231 A1 | 5/2016 | Ishihara |
| 2016/0280585 A1 | 9/2016 | Mazany |
| 2016/0280612 A1 | 9/2016 | Mazany |
| 2017/0036945 A1 | 2/2017 | Ishihara |
| 2017/0267595 A1 | 9/2017 | Mazany |
| 2017/0342555 A1* | 11/2017 | Mazany .................. C23C 4/12 |
| 2017/0349825 A1 | 12/2017 | Mazany |
| 2017/0369713 A1 | 12/2017 | Poteet |
| 2017/0369714 A1 | 12/2017 | Nicolaus |
| 2018/0044537 A1* | 2/2018 | Poteet .................... B05D 1/28 |
| 2019/0055393 A1 | 2/2019 | Tsuji |
| 2019/0233324 A1 | 8/2019 | Poteet et al. |
| 2020/0148340 A1 | 5/2020 | Poteet et al. |
| 2021/0087102 A1 | 3/2021 | Simard et al. |
| 2021/0094887 A1 | 4/2021 | Poteet et al. |
| 2021/0198159 A1 | 7/2021 | Poteet et al. |
| 2023/0150884 A1 | 5/2023 | Khan et al. |
| 2024/0391835 A1 | 11/2024 | Khan et al. |

FOREIGN PATENT DOCUMENTS

| | | |
|---|---|---|
| CN | 101328077 | 12/2008 |
| CN | 101898906 | 12/2010 |
| CN | 102515850 | 6/2012 |
| CN | 101712563 | 9/2012 |
| CN | 103274760 | 9/2013 |
| CN | 105237039 | 1/2016 |
| CN | 105646007 | 4/2018 |
| CN | 107935634 | 4/2018 |
| CN | 107986807 | 10/2020 |
| CN | 113831155 | 12/2021 |
| DE | 69830510 | 3/2006 |
| EP | 200568 | 11/1986 |
| EP | 0677499 | 10/1995 |
| EP | 1043290 | 10/2000 |
| EP | 1693262 | 8/2006 |
| EP | 1834937 | 9/2007 |
| EP | 1968914 | 7/2010 |
| EP | 2684752 | 1/2014 |
| EP | 2767529 | 8/2014 |
| EP | 2774900 | 9/2014 |
| EP | 2930162 | 10/2015 |
| EP | 3072865 | 9/2016 |
| EP | 3072866 | 9/2016 |
| EP | 3222602 | 9/2017 |
| EP | 3255027 | 12/2017 |
| EP | 3282038 | 2/2018 |
| EP | 3184228 | 7/2019 |
| EP | 3530637 | 8/2019 |
| EP | 3590910 | 1/2020 |
| EP | 3702342 | 9/2020 |
| EP | 3842404 | 6/2021 |
| EP | 4086234 | 11/2022 |
| EP | 4227286 | 8/2023 |
| EP | 4279472 | 11/2023 |
| GB | 2468378 | 9/2010 |
| JP | S56105442 | 8/1981 |
| JP | S6011353 A | 1/1985 |
| JP | H0812477 | 1/1996 |
| JP | 09301786 | 11/1997 |
| JP | 2006036551 | 2/2006 |
| KR | 20050022947 | 3/2005 |
| KR | 20090035732 | 4/2009 |
| WO | WO 9742135 | 11/1997 |
| WO | WO 0051950 | 9/2000 |
| WO | WO 03084899 | 10/2003 |
| WO | WO 2007078419 | 7/2007 |
| WO | 2010001021 | 1/2010 |
| WO | WO 2014035413 | 3/2014 |
| WO | WO 2015169024 | 11/2015 |

OTHER PUBLICATIONS

USPTO, Notice of Allowance dated Aug. 31, 2022 in U.S. Appl. No. 17/330,163.

European Patent Office, European Search Report dated Sep. 23, 2022 in Application No. 22171665.7.

USPTO, Corrected Notice of Allowance dated Oct. 17, 2022 in U.S. Appl. No. 17/378,207.

USPTO; Advisory Action dated Apr. 26, 2024 in U.S. Appl. No. 17/079,239.

USPTO; Notice of Allowance dated Apr. 19, 2024 in U.S. Appl. No. 17/527,423.

USPTO, Notice of Allowance dated Dec. 21, 2022 in U.S. Appl. No. 16/190,817.

USPTO, Advisory Action dated Nov. 1, 2022 in U.S. Appl. No. 16/029,134.

European Patent Office, European Office Action dated Aug. 18, 2022 in Application No. 17183478.1.

European Patent Office, European Office Action dated Nov. 24, 2022 in Application No. 19184523.9.

European Patent Office, European Office Action dated Jan. 26, 2023 in Application No. 19207148.8.

USPTO, Final Office Action dated Jan. 25, 2024 in U.S. Appl. No. 17/079,239.

USPTO, Non-Final Office Action dated Jan. 16, 2024 in U.S. Appl. No. 17/527,423.

USPTO, Non-Final Office Action dated Feb. 1, 2024 in U.S. Appl. No. 17/671,361.

International Searching Authority, International Search Report and Written Opinion dated Apr. 20, 2005 in Application No. PCT/US2004/012222.

International Searching Authority, International Preliminary Report on Patentability dated Aug. 18, 2005 in Application No. PCT/US2004/012222.

International Searching Authority, International Search Report and Written Opinion dated Jul. 3, 2007 in Application No. PCT/US2006/043343.

European Patent Office, Office Action dated Jan. 4, 2008 in Application No. 04816727.4.

USPTO, Office Action dated Feb. 26, 2008 in U.S. Appl. No. 10/829,144.

International Searching Authority, International Preliminary Report on Patentability dated Mar. 12, 2008 in Application No. PCT/US2006/043343.

USPTO, Final Office Action dated Jul. 16, 2008 in U.S. Appl. No. 10/829,144.

USPTO, Office Action dated Oct. 24, 2008 in U.S. Appl. No. 10/829,144.

European Patent Office, Communication Pursuant to Article 94(3) EPC dated Oct. 28, 2008 in European Application No. 06837063.4.

USPTO, Restriction Requirement dated Feb. 5, 2009 in U.S. Appl. No. 11/315,592.

USPTO, Final Office Action dated Jan. 29, 2009 in U.S. Appl. No. 10/829,144.

European Patent Office, Communication Pursuant to Article 94(3) EPC dated Feb. 9, 2009 in European Application No. 06837063.4.

USPTO, Office Action dated May 29, 2009 in U.S. Appl. No. 10/829,144.

USPTO, Office Action dated Jun. 9, 2009 in U.S. Appl. No. 11/315,592.

USPTO, Notice of Allowance dated Oct. 1, 2009 in U.S. Appl. No. 10/829,144.

USPTO, Final Office Action dated Dec. 11, 2009 in U.S. Appl. No. 11/315,592.

(56) References Cited

OTHER PUBLICATIONS

European Patent Office, Communication under Rule 71(3) EPC dated Feb. 4, 2010 in European Application No. 06837063.4.
USPTO, Advisory Action dated Feb. 25, 2010 in U.S. Appl. No. 11/315,592.
USPTO, Office Action dated Apr. 1, 2010 in U.S. Appl. No. 11/315,592.
European Patent Office, Partial European Search Report dated Oct. 29, 2010 in European Application No. 10169627.6.
USPTO, Office Action dated Feb. 4, 2011 in U.S. Appl. No. 12/619,061.
USPTO, Office Action dated Feb. 22, 2011 in U.S. Appl. No. 12/829,178.
European Patent Office, Extended European Search Report dated May 4, 2011 in European Application No. 10169627.6.
USPTO, Final Office Action dated Aug. 19, 2011 in U.S. Appl. No. 12/829,178.
USPTO, Advisory Action dated Oct. 27, 2011 in U.S. Appl. No. 12/829,178.
U.S. Appl. No. 15/076,348, filed Mar. 21, 2016 titled "High Temperature Oxidation Protection for Composites," 42 pages.
U.S. Appl. No. 15/169,219, filed May 31, 2016 titled "High Temperature Oxidation Protection for Composites," 37 pages.
U.S. Appl. No. 15/169,257, filed May 31, 2016 titled "High Temperature Oxidation Protection for Composites," 40 pages.
U.S. Appl. No. 15/174,537, filed Jun. 6, 2016 titled "Nanocomposite Coatings for Oxidation Protection for Composites," 44 pages.
U.S. Appl. No. 15/194,034, filed Jun. 27, 2016 titled "High Temperature Oxidation Protection for Composites," 49 pages.
U.S. Appl. No. 15/234,903, filed Aug. 11, 2016 titled "High Temperature Oxidation Protection for Composites," 41 pages.
U.S. Appl. No. 15/380,442, filed Dec. 15, 2016 titled "High Temperature Oxidation Protection for Composites," 41 pages.
European Patent Office, Extended European Search Report dated Jul. 26, 2016 in European Application No. 16161832.7.
USPTO, Restriction Requirement dated Nov. 7, 2016 in U.S. Appl. No. 14/671,637.
USPTO, Pre-interview First Office Action dated Mar. 6, 2017 in U.S. Appl. No. 14/671,637.
USPTO, First Action Interview Office Action dated May 12, 2017 in U.S. Appl. No. 14/671,637.
USPTO, Restriction Requirement dated Jan. 5, 2018 in U.S. Appl. No. 15/076,348.
European Patent Office, Extended European Search Report dated Aug. 2, 2017 in European Application No. 17159538.2.
Rovner; "A Haven for Glass, Ceramics"; Science & Technology; May 24, 2004; pp. 33-39.
Air Products and Chemicals, Inc., "Complete Product Offering," 4 pages, retrieved from www.airproducts.com on Jun. 28, 2004.
Mckee, Chemistry and Physics of Carbon, vol. 16, P.L. Walker and P.A. Thrower eds., Marcel Dekker, 1981, p. 30-42.
Sosman, "The Common Refractory Oxides," The Journal of Industrial and Engineering Chemistry, vol. 8, No. 11, Nov. 1916, pp. 985-990.
Almatis Website, C-333, Accessed Feb. 8, 2011, p. 1.
Montedo et al., Crystallisation Kinetics of a B-Spodumene-Based Glass Ceramic, Advances in Materials Science and Engineering, pp. 1-9, vol. 2012, Article ID 525428, Hindawi Publishing Corporation.
European Patent Office, Extended European Search Report dated Oct. 9, 2017 in European Application No. 17173709.1.
European Patent Office, Extended European Search Report dated Oct. 17, 2017 in European Application No. 17173707.5.
Sun Lee W et al., "Comparative study of thermally conductive fillers in underfill for the electronic components", Diamond and Related Materials, Elsevier Science Publishers, Amsterdam, NL, vol. 14, No. 10, Oct. 1, 2005 (Oct. 1, 2005), pp. 1647-1653.
Rockwood Lithium, Spodumene Concentrate SC 7.5 premium, Aug. 2015, pp. 1-2. The Lithium Company.
D.D.L. Chung: "Acid Aluminum Phosphate for the Binding and Coating of Materials", Journal of Materials Science, vol. 38, No. 13, 2003, pp. 2785-2791.
European Patent Office, Extended European Search Report dated Nov. 6, 2017 in European Application No. 17174481.6.
USPTO, Final Office Action dated Jan. 17, 2018 in U.S. Appl. No. 14/671,637.
European Patent Office, Communication Pursuant to Article 94(3) dated Jan. 3, 2018 in European Application No. 16161832.7.
European Patent Office, Extended European Search Report dated Nov. 20, 2017 in European Application No. 17175809.7.
European Patent Office, Extended European Search Report dated Nov. 20, 2017 in European Application No. 17178011.7.
European Patent Office, Partial European Search Report dated Jan. 13, 2018 in European Application No. 17183478.1.
USPTO, Advisory Action dated Mar. 30, 2018 in U.S. Appl. No. 14/671,637.
USPTO, Non-Final Office Action dated May 1, 2018 in U.S. Appl. No. 15/076,348.
USPTO, Restriction/Election Requirement dated May 24, 2018 in U.S. Appl. No. 15/174,537.
USPTO, Non-Final Office Action dated Mar. 28, 2018 in U.S. Appl. No. 15/234,903.
European Patent Office, European Search Report dated Apr. 11, 2018 in European Application No. 17183478.1-1103.
European Patent Office, European Search Report dated Apr. 13, 2018 in European Application No. 17207767.9-1106.
USPTO, Restriction/Election Requirement dated Jun. 19, 2018 in U.S. Appl. No. 15/194,034.
USPTO, Notice of Allowance dated Jun. 5, 2018 in U.S. Appl. No. 14/671,637.
USPTO, Corrected Notice of Allowance dated Jun. 22, 2018 in U.S. Appl. No. 14/671,637.
USPTO, Non-Final Office Action dated Jul. 27, 2018 in U.S. Appl. No. 15/174,537.
Steven A. Poteet, et al., U.S. Appl. No. 16/029,134, filed Jul. 6, 2018 titled "High Temperature Oxidation Protection for Composites," 43 pages.
Steven A. Poteet, et al., U.S. Appl. No. 15/886,671, filed Feb. 1, 2018 titled "High Temperature Oxidation Protection for Composites," 45 pages.
European Patent Office, European Office Action date Jul. 16, 2018 in Application No. 17174481.6.
Steven A. Poteet, U.S. Appl. No. 16/102,100, filed Aug. 13, 2018 titled "High Temperature Oxidation Protection for Composites," 47 pages.
USPTO, Notice of Allowance dated Aug. 24, 2018 in U.S. Appl. No. 14/671,637.
Anthony Mazany, U.S. Appl. No. 16/116,665, filed Aug. 29, 2018 titled "Formulations for Oxidation Protection of Composite Articles", 30 pages.
USPTO, Restriction/Election Requirement dated Aug. 30, 2018 in U.S. Appl. No. 15/169,219.
USPTO, Restriction/Election Requirement dated Aug. 30, 2018 in U.S. Appl. No. 15/169,257.
USPTO, Final Office Action dated Oct. 26, 2018 in U.S. Appl. No. 15/234,903.
USPTO, Final Office Action dated Nov. 5, 2018 in U.S. Appl. No. 15/076,348.
Steven A. Poteet, U.S. Appl. No. 16/190,817, filed Nov. 14, 2018 titled "High Temperature Oxidation Protection for Composites," 38 pages.
USPTO, Non-Final Office Action filed Dec. 19, 2018 in U.S. Appl. No. 15/169,219.
USPTO, Non-Final Office Action filed Dec. 19, 2018 in U.S. Appl. No. 15/169,257.
USPTO, Non-Final Office Action filed Dec. 21, 2018 in U.S. Appl. No. 15/194,034.
USPTO, Advisory Action filed Dec. 28, 2018 in U.S. Appl. No. 15/076,348.
USPTO, Advisory Action filed Jan. 17, 2019 in U.S. Appl. No. 15/234,903.

(56) References Cited

OTHER PUBLICATIONS

USPTO, Final Office Action filed Feb. 14, 2019 in U.S. Appl. No. 15/174,537.
USPTO, Non-Final Office Action filed Feb. 25, 2019 in U.S. Appl. No. 15/234,903.
USPTO, Non-Final Office Action dated Apr. 16, 2019 in U.S. Appl. No. 15/076,348.
USPTO, Notice of Allowance dated Apr. 3, 2019 in U.S. Appl. No. 15/169,257.
USPTO, Advisory Action dated May 17, 2019 in U.S. Appl. No. 15/174,537.
USPTO, Final Office Action dated May 15, 2019 in U.S. Appl. No. 15/194,034.
USPTO, Restriction/Election Requirement dated Apr. 5, 2019 in U.S. Appl. No. 15/380,442.
USPTO, Non-Final Office Action filed Jun. 7, 2019 in U.S. Appl. No. 15/174,537.
USPTO, Notice of Allowance dated Jun. 17, 2019 in U.S. Appl. No. 15/169,257.
European Patent Office, European Office Action date Jun. 21, 2019 in Application No. 19155021.9.
USPTO, Notice of Allowance filed Jun. 26, 2019 in U.S. Appl. No. 15/169,219.
USPTO, Pre-Interview First Office Action dated Jul. 26, 2019 in U.S. Appl. No. 15/380,442.
USPTO, Notice of Allowance dated Aug. 13, 2019 in U.S. Appl. No. 15/194,034.
European Patent Office, Communication pursuant to Article 94(3) dated Aug. 28, 2019 in Application No. 17173707.5.
USPTO, Final Office Action filed Aug. 30, 2019 in U.S. Appl. No. 15/234,903.
The National Academies Press, Committee on Advanced Fibers for High-Temperature Ceramic Composites, Ceramic Fibers and Coatings: Advanced Materials for the Twenty-First Century, Chapter 6: Interfacial Coatings, (1998), p. 1-48 (Year: 1998).
USPTO, Notice of Allowance dated Sep. 25, 2019 in U.S. Appl. No. 15/380,442.
USPTO, Supplemental Notice of Allowance filed Oct. 2, 2019 in U.S. Appl. No. 15/169,219.
Steven A. Poteet, U.S. Appl. No. 16/666,809, filed Oct. 29, 2019 titled "High Temperature Oxidation Protection for Composites", 45 pages.
USPTO, Advisory Action filed Nov. 20, 2019 in U.S. Appl. No. 15/234,903.
European Patent Office, European Search Report dated Nov. 25, 2019 in Application No. 19184523.9.
USPTO, Restriction/Election Requirement dated Dec. 13, 2019 in U.S. Appl. No. 15/886,671.
European Patent Office, European Search Report dated Dec. 13, 2019 in Application No. 19191306.0.
USPTO, Notice of Allowance dated Feb. 21, 2020 in U.S. Appl. No. 16/116,665.
European Patent Office, European Search Report dated Mar. 23, 2020 in Application No. 19207148.8.
USPTO, Pre-Interview First Office Action dated Apr. 17, 2020 in U.S. Appl. No. 15/886,671.
USPTO, Restriction/Election Requirement dated Apr. 30, 2020 in U.S. Appl. No. 16/029,134.
USPTO, Notice of Allowance filed May 1, 2020 in U.S. Appl. No. 15/234,903.
USPTO, Corrected Notice of Allowance dated May 28, 2020 in U.S. Appl. No. 16/116,665.
USPTO, First Action Interview Office Action dated Jun. 4, 2020 in U.S. Appl. No. 15/886,671.
USPTO, Corrected Notice of Allowance filed Jul. 9, 2020 in U.S. Appl. No. 15/234,903.
USPTO, Corrected Notice of Allowance filed Aug. 7, 2020 in U.S. Appl. No. 15/234,903.
USPTO, Restriction/Election Requirement filed Jul. 14, 2020 in U.S. Appl. No. 16/102,100.
USPTO, Final Office Action dated Sep. 9, 2020 in U.S. Appl. No. 15/886,671.
USPTO, Non-Final Office Action dated Oct. 29, 2020 in U.S. Appl. No. 16/666,809.
European Patent Office, European Office Action dated Oct. 22, 2020 in Application No. 17173709.1.
USPTO, Advisory Action dated Nov. 17, 2020 in U.S. Appl. No. 15/886,671.
USPTO, Non-Final Office Action filed Nov. 17, 2020 in U.S. Appl. No. 16/102,100.
USPTO, Notice of Allowance dated Dec. 7, 2020 in U.S. Appl. No. 16/589,368.
European Patent Office, European Search Report dated Nov. 19, 2020 in Application No. 17178011.7.
USPTO, Notice of Allowance dated Jan. 1, 2021 in U.S. Appl. No. 16/453,59.
USPTO, Supplemental Notice of Allowance dated Feb. 9, 2021 in U.S. Appl. No. 16/589,368.
USPTO, Supplemental Notice of Allowance dated Feb. 9, 2021 in U.S. Appl. No. 16/453,593.
USPTO, Final Office Action dated Feb. 2, 2021 in U.S. Appl. No. 16/666,809.
USPTO, Supplemental Notice of Allowance dated Mar. 2, 2021 in U.S. Appl. No. 16/453,593.
USPTO, Notice of Allowance dated Mar. 8, 2021 in U.S. Appl. No. 16/102,100.
USPTO, Decision on Appeal dated Apr. 5, 2021 in U.S. Appl. No. 15/076,348.
USPTO, Advisory Action dated Apr. 7, 2021 in U.S. Appl. No. 16/666,809.
USPTO, Notice of Allowance dated Apr. 15, 2021 in U.S. Appl. No. 16/666,809.
U.S. Appl. No. 17/527,423, filed Nov. 16, 2021 entitled "High Temperature Oxidation Protection for Carbon-Carbon Composites," 41 pages.
USPTO, Supplemental Notice of Allowance dated Feb. 24, 2022 in U.S. Appl. No. 17/185,016.
USPTO, Pre-Interview First Office Action dated Mar. 21, 2022 in U.S. Appl. No. 16/029,134.
USPTO, Pre-Interview Office Action dated Mar. 1, 2022, 2022 in U.S. Appl. No. 16/190,817.
U.S. Appl. No. 17/671,361, filed Feb. 14, 2022 entitled "Oxidation Protection With Improved Water Resistance for Composites," 38 pages.
European Patent Office, European Search Report dated Nov. 20, 2023 in Application No. 23179864.6.
Liu et al: "Effect of Al2O3 addition on the microstructure and oxidation behavior of SiC coating prepared by pack cementation on C/C composites", Ceramics International, Elsevier, Amsterdam, NL, vol. 47, No. 20, Jul. 13, 2021 (Jul. 13, 2021), pp. 29309-29319, XP086762324, ISSN: 0272-8842, DOI: 10.1016/J.CERAMINT. 2021.07.096 [retrieved on Jul. 13, 2021.
USPTO, Advisory Action dated Dec. 8, 2023 in U.S. Appl. No. 17/671,361.
European Patent Office, European Search Report dated May 10, 2021 in Application No. 20216996.7.
USPTO, Corrected Notice of Allowance dated Jun. 4, 2021 in U.S. Appl. No. 16/102,100.
European Patent Office, European Office Action dated Jul. 7, 2021 in Application No. 17183478.1.
USPTO, Corrected Notice of Allowance dated Jun. 11, 2021 in U.S. Appl. No. 16/668,852.
USPTO, Notice of Allowance dated Jul. 12, 2021 in U.S. Appl. No. 16/666,809.
USPTO, Notice of Allowance dated Feb. 1, 2022 in U.S. Appl. No. 17/185,016.
U.S. Appl. No. 17/527,423, filed Nov. 16, 2021 titled "High Temperature Oxidation Protection for Carbon-Carbon Composites," 41 pages.
USPTO, Notice of Allowance dated Jul. 8, 2022 in U.S. Appl. No. 17/330,163.
USPTO, Notice of Allowance dated Jun. 29, 2022 in U.S. Appl. No. 17/378,207.

(56) References Cited

OTHER PUBLICATIONS

USPTO, Corrected Notice of Allowance dated Jul. 19, 2022 in U.S. Appl. No. 17/378,207.
USPTO, First Action Interview Office Action dated Jun. 30, 2022 in U.S. Appl. No. 16/190,817.
USPTO, Corrected Notice of Allowance dated Mar. 1, 2023 in U.S. Appl. No. 16/190,817.
European Patent Office, European Office Action dated Feb. 17, 2023 in Application No. 17180111.7.
USPTO, Requirement for Restriction dated Apr. 26, 2023 in U.S. Appl. No. 17/079,239.
USPTO, Non-Final Office Action dated Mar. 30, 2023 in U.S. Appl. No. 17/671,361.
European Patent Office, European Search Report dated Apr. 12, 2023 in Application No. 22207343.9.
European Patent Office, European Search Report dated May 23, 2023 in Application No. 23150808.6.
Chemical Abstracts, (Aug. 12, 1985), vol. 103, ISSN 0009-2258, XP000189303 [A] 1-15 * abstract *.
Buchanan F J, et al. "Particulate-containing glass sealents for carbon-carbon composites" Carbon, Elsevier Oxford, GB, vol. 33, No. 4, 1995, pp. 491-497.
USPTO, Non-Final Office Action dated Jul. 13, 2023 in U.S. Appl. No. 17/079,239.
European Patent Office, European Search Report dated Jul. 7, 2023 in Application No. 23156560.7.
USPTO, Notice of Allowance dated Apr. 15, 2021 in U.S. Appl. No. 16/668,852.
European Patent Office, European Office Action dated Oct. 22, 2021 in Application No. 19191306.0.
USPTO, Non-Final Office Action dated Nov. 18, 2021 in U.S. Appl. No. 15/076,348.
USPTO, Restriction/Election Requirement dated Dec. 1, 2021 in U.S. Appl. No. 16/190,817.
USPTO, First Action Interview Office Action dated May 9, 2022 in U.S. Appl. No. 16/029,134.
USPTO, Notice of Allowance dated May 25, 2022 in U.S. Appl. No. 17/330,163.
European Patent Office, European Office Action dated Sep. 1, 2023 in Application No. 19184523.9.
European Patent Office, European Search Report dated Sep. 22, 2023 in Application No. 23173619.0.
Pechentkovskaya L. E. et al, "Effect of the different crystal structures of boron nitride on its high-temperature stability in oxygen", Soviet Powder Metallurgy and Metal Ceramics, [Online] vol. 20, No. 7, Jul. 1981 (Jul. 1981), pp. 510-512, DOI: 10.1007/BF00800535, Retrieved from the Internet: url: https://link.springer.com/article/10.1007/BF00800535, [retrieved on Sep. 13, 2023].
USPTO, Final Office Action dated Sep. 28, 2023 in U.S. Appl. No. 17/671,361.
USPTO, Examiner's Answer to Appeal Brief dated Sep. 7, 2023 in U.S. Appl. No. 16/029,134.
USPTO; Non-Final Office Action dated May 21, 2024 in U.S. Appl. No. 17/079,239.
USPTO; Requirement for Restriction dated Jul. 17, 2024 in U.S. Appl. No. 17/747,816.
USPTO; Final Office Action dated Jun. 27, 2024 in U.S. Appl. No. 17/671,361.
European Patent Office, European Search Report dated Aug. 27, 2024 in Application No. 24164939.1.
European Patent Office, European Search Report dated Sep. 4, 2024 in Application No. 24164789.0.
USPTO; Advisory Action dated Sep. 5, 2024 in U.S. Appl. No. 17/671,361.
Tsung-Ming et al.: "On the Oxidation Kinetics and Mechanisms of Various SiC-Coated Carbon-Carbon Composites", Carbon, Elsevier Oxford, GB, vol. 29, No. 8, 1991, pp. 1257-1265, XP024029999, ISSN: 0008-6223, DOI: 10.1016/ 0008-6223(91)90045-K.
USPTO; Non-Final Office Action dated Jan. 21, 2025 in U.S. Appl. No. 18/765,864.
USPTO; Corrected Notice of Allowance dated Feb. 13, 2025 in U.S. Appl. No. 17/747,816.
USPTO; Notice of Allowance dated Feb. 5, 2025 in U.S. Appl. No. 17/747,816.
USPTO; Requirement for Restriction/ Election dated Feb. 20, 2025 in U.S. Appl. No. 18/186,821.
USPTO; Notice of Allowance dated Mar. 3, 2025 in U.S. Appl. No. 17/571,083.
USPTO; Corrected Notice of Allowance dated Mar. 12, 2025 in U.S. Appl. No. 17/571,083.
USPTO; Notice of Allowance dated Mar. 12, 2025 in U.S. Appl. No. 17/747,816.
USPTO; Notice of Allowance dated Mar. 7, 2025 in U.S. Appl. No. 17/308,776.
USPTO; Corrected Notice of Allowance dated Apr. 9, 2025 in U.S. Appl. No. 17/747,816.

* cited by examiner

HIGH TEMPERATURE OXIDATION PROTECTION FOR CARBON-CARBON COMPOSITES

FIELD

The present disclosure relates generally to composites and, more specifically, to oxidation protection systems for carbon-carbon composite structures.

BACKGROUND

Oxidation protection systems for carbon-carbon composites are typically designed to minimize loss of carbon material due to oxidation at operating conditions, which include temperatures of 900° C. (1652° F.) or higher. Layers comprising ceramic materials within an oxidation protection system that are deposited onto a substrate by chemical vapor deposition (CVD) may provide desirable oxidation protection. However, CVD processes may be expensive and cost-prohibitive. Thus, a more economical and seamless oxidation protection system having a layer comprising a ceramic material may be desired.

SUMMARY

A method for forming an oxidation protection system on a composite structure is provided. In various embodiments, the method may comprise applying a ceramic layer slurry to the composite structure, wherein the ceramic layer slurry may comprise aluminum and silicon in a solvent or carrier fluid; heating the composite structure to form a ceramic layer on the composite structure, wherein the ceramic layer may comprise aluminum nitride; applying a sealing slurry to the composite structure, wherein the sealing slurry may comprise a sealing pre-slurry composition and a sealing carrier fluid, wherein the sealing pre-slurry composition may comprise a sealing phosphate glass composition; and/or heating the composite structure to form a sealing layer on the composite structure. In various embodiments, the method may further comprise preparing the ceramic layer slurry by combining aluminum powder and silicon powder in the solvent or carrier fluid. In various embodiments, the method may further comprise preparing the sealing slurry by combining the sealing pre-slurry composition with the sealing carrier fluid. In various embodiments, the aluminum and the silicon, together, may comprise between 40% and 50% by weight of the ceramic layer slurry. In various embodiments, of the aluminum and the silicon together, the aluminum may comprise between 10% and 99% by weight, and the silicon may comprise between 90% and 1% by weight.

In various embodiments, the ceramic layer may be disposed between the sealing layer and the composite structure. In various embodiments, the composite structure may be heated to a temperature between 500° C. and 1500° C. to form the ceramic layer. In various embodiments, heating the composite structure to form the ceramic layer may be completed in an environment comprising nitrogen gas, wherein the composite structure may be heated to a temperature of at least 900° C. The composite structure may be heated to a temperature of at least 1400° C., wherein the ceramic layer may further comprise silicon nitride. In various embodiments, heating the composite structure to form the ceramic layer may be completed in an environment comprising ammonia gas, wherein the composite structure may be heated to a temperature of at least 600° C. The composite structure may be heated to a temperature of at least 900° C., wherein the ceramic layer may further comprise silicon nitride.

In various embodiments, the method may further comprise applying a boron compound slurry to the composite structure prior to applying the ceramic layer slurry to the composite structure; and/or allowing the boron compound slurry to dry on the composite structure to form a boron compound layer. In various embodiments, the boron compound slurry may comprise boron carbide, and the ceramic layer may further comprise aluminum boron carbide.

In various embodiments, the ceramic layer slurry may further comprise silicon oxycarbide. The ceramic layer may further comprise alumina and silicon carbide.

In various embodiments, the sealing phosphate glass composition may be represented by the formula $a(A'_2O)_x(P_2O_5)_{y1}b(G_fO)_{y2}c(A''O)_z$:

A' is selected from: lithium, sodium, potassium, rubidium, cesium, and mixtures thereof;

$G_f$ is selected from: boron, silicon, sulfur, germanium, arsenic, antimony, bismuth, and mixtures thereof;

A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof;

a is a number in the range from 1 to about 5;

b is a number in the range from 0 to about 10;

c is a number in the range from 0 to about 30;

x is a number in the range from about 0.050 to about 0.500;

y1 is a number in the range from about 0.100 to about 0.950;

y2 is a number in the range from 0 to about 0.20; and z is a number in the range from about 0.01 to about 0.5;

$(x+y1+y2+z)=1$; and $x<(y1+y2)$.

In various embodiments, an oxidation protection system disposed on an outer surface of a substrate may comprise a ceramic layer comprising aluminum nitride; and/or a sealing layer comprising a sealing pre-slurry composition comprising a sealing phosphate glass composition. In various embodiments, the ceramic layer may further comprise silicon oxycarbide, alumina, and/or aluminum borocarbide.

In various embodiments, an aircraft brake disk may comprise a carbon-carbon composite structure comprising a non-friction surface; and/or an oxidation protection system disposed on the non-friction surface. The oxidation protection system may comprise a ceramic layer comprising aluminum nitride; and/or a sealing layer comprising a sealing pre-slurry composition comprising a sealing phosphate glass composition. In various embodiments, the ceramic layer may further comprise silicon oxycarbide, alumina, and aluminum borocarbide.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Figure 1A:
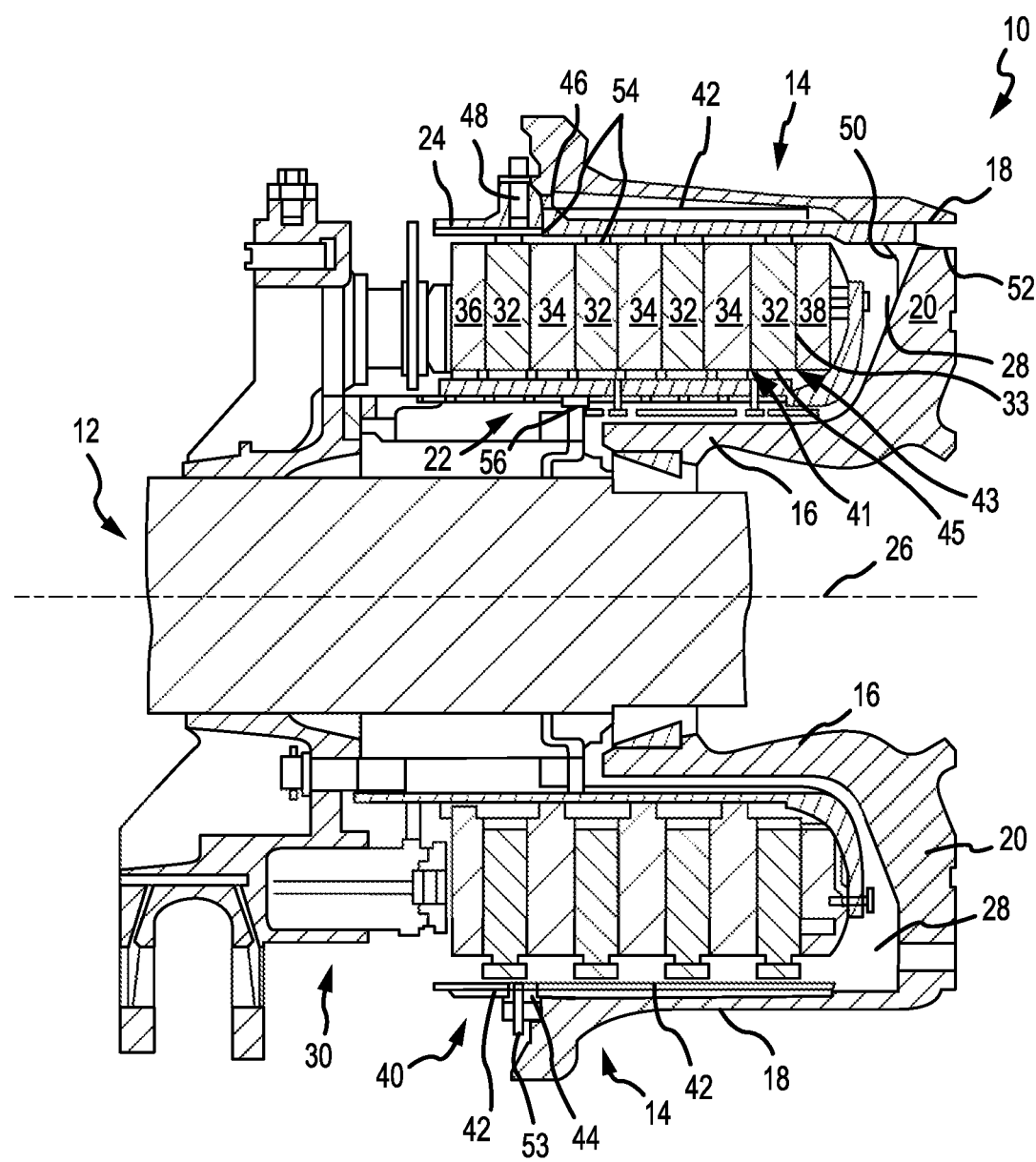
- FIG. 1A illustrates a cross sectional view of an aircraft wheel braking assembly, in accordance with various embodiments.
Figure 1B:
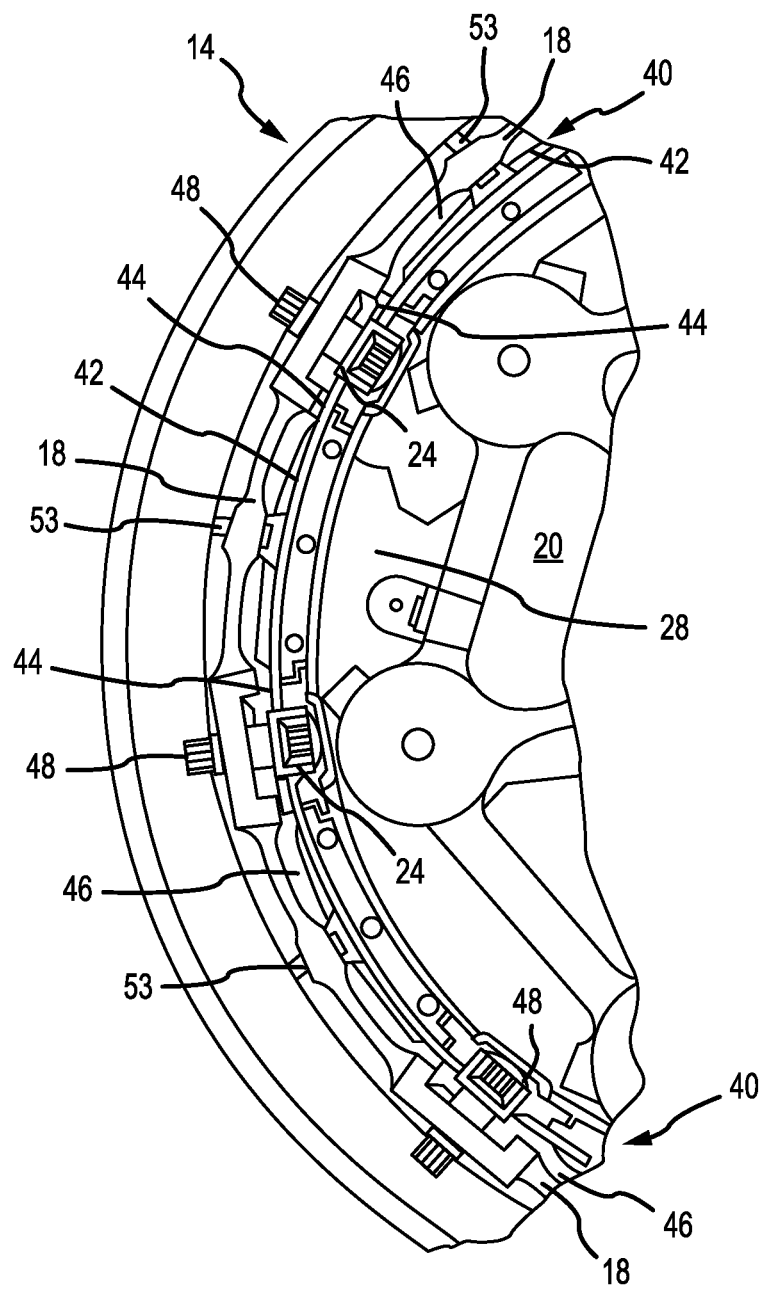
FIG. 1B illustrates a partial side view of an aircraft wheel braking assembly, in accordance with various embodiments.

With initial reference to FIGS. 1A and 1B, aircraft wheel braking assembly 10 such as may be found on an aircraft, in accordance with various embodiments is illustrated. Aircraft wheel braking assembly may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield segments 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of aircraft wheel braking assembly 10 as viewed into wheel well 18 and wheel well recess 28.

In various embodiments, the various components of aircraft wheel braking assembly 10 may be subjected to the application of compositions and methods for protecting the components from oxidation.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

Carbon-carbon composites (also referred to herein as composite structures, composite substrates, and carbon-carbon composite structures, interchangeably) in the friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield segments 42. With reference to FIG. 1B, heat shield 40 is attached to wheel 14 and is concentric with wheel well 18. Individual heat shield segments 42 may be secured in place between wheel well 18 and rotors 32 by respective heat shield carriers 44 fixed to wheel well 18. Air gap 46 is defined annularly between heat shield segments 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield segments 42 and respective heat shield carriers 44 can then be fastened to wheel well 18 by heat shield fasteners 53.

Under the operating conditions (e.g., high temperature) of aircraft wheel braking assembly 10, carbon-carbon composites may be prone to material loss from oxidation of the carbon. For example, various carbon-carbon composite components of aircraft wheel braking assembly 10 may experience both catalytic oxidation and inherent thermal oxidation caused by heating the composite during operation. In various embodiments, composite rotors 32 and stators 34 may be heated to sufficiently high temperatures that may oxidize the carbon surfaces exposed to air. At elevated temperatures, infiltration of air and contaminants may cause internal oxidation and weakening, especially in and around rotor lugs 54 or stator slots 56 securing the friction disks to the respective torque bar 24 and torque take-out assembly 22. Because carbon-carbon composite components of aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt (e.g., NaCl) deposits left from seawater or sea spray. These and other contaminants (e.g. Ca ions, Fe ions, oxides and salts containing Fe ions and/or Ca ions, etc.) can penetrate and leave deposits in the pores of carbon-carbon composite aircraft brakes, including the substrate and any reaction-formed porous barrier coating. When such contamination occurs, the rate of carbon loss by oxidation can be increased by one to two orders of magnitude.

In various embodiments, components of aircraft wheel braking assembly 10 may reach operating temperatures in the range from about 100° C. (212° F.) up to about 900° C. (1652° F.), or higher (e.g., 1093° C. (2000° F.) on a wear or friction surface of a brake disk). However, it will be recognized that the oxidation protection systems compositions and methods of the present disclosure may be readily adapted to many parts in this and other braking assemblies, as well as to other carbon-carbon composite structures susceptible to oxidation losses from infiltration of atmospheric oxygen and/or catalytic contaminants.

In various embodiments, a method for limiting an oxidation reaction in a substrate (e.g., a composite structure) may comprise forming an oxidation protection system on the composite structure. Forming the oxidation protection system may comprise forming a ceramic layer slurry by combining aluminum and silicon in a solvent and/or carrier fluid, applying the ceramic slurry to a composite structure, and heating the composite structure to a temperature sufficient to form a ceramic layer on the composite structure. In various embodiments, forming the oxidation protection system may further comprise forming a sealing pre-slurry composition, comprising a sealing phosphate glass composition (in the form of a glass frit, powder, or other suitable pulverized form), with a carrier fluid (such as, for example, water), applying the sealing slurry to a composite structure, and heating the composite structure to a temperature sufficient to dry the carrier fluid and form an oxidation protection coating on the composite structure, which in various embodiments may be referred to a sealing layer. In various embodiments, the sealing pre-slurry composition of the sealing slurry may comprise additives, such as, for example, ammonium dihydrogen phosphate and/or aluminum orthophosphate, among others, to improve hydrolytic stability and/or to increase the composite structure's resistance to oxidation, thereby tending to reduce mass loss of composite structure.

Figure 2A:
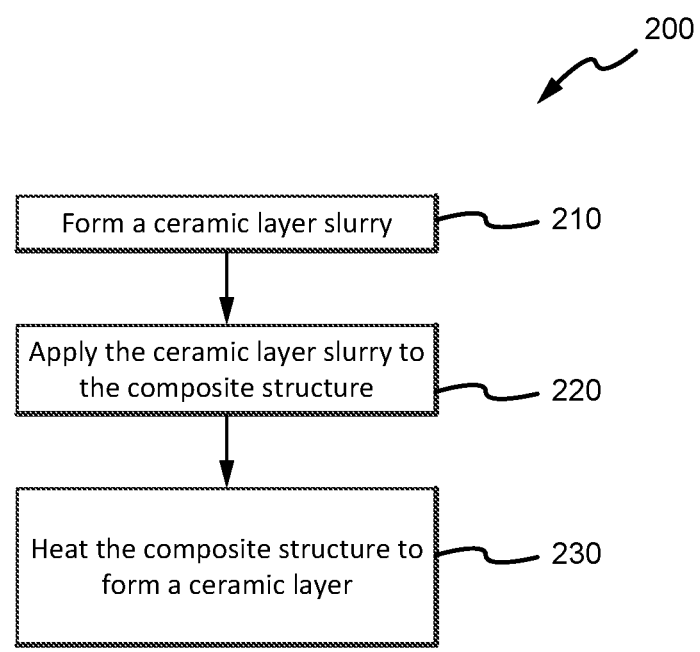
FIGS. 2A, 2B, and 2C illustrate methods for coating a composite structure, in accordance with various embodiments.

With initial reference to FIGS. 1A and 2A, a method 200 for coating a composite structure in accordance with various embodiments is illustrated. Method 200 may, for example, comprise applying an oxidation protection system to non-wearing surfaces of carbon-carbon composite brake components, such as non-wear surfaces 45 and/or rotor lugs 54. Non-wear surfaces (e.g., non-wear surface 45, as labeled in FIG. 1A) simply reference an exemplary non-wear surface on a brake disk (i.e., a non-friction surface that does not contribute to brake function by having friction with another component, such as another brake disk), but non-wear surfaces similar to non-wear surface 45 may be present on any brake disks (e.g., rotors 32, stators 34, pressure plate 36, end plate 38, or the like). In various embodiments, method 200 may be used on the back face of pressure plate 36 and/or end plate 38, an inner diameter (ID) surface of stators 34 including stator slots 56, as well as outer diameter (OD) surfaces of rotors 32 including lugs 54. The oxidation inhibiting composition of method 200 may be applied to preselected regions of a carbon-carbon composite structure that may be otherwise susceptible to oxidation. For example, aircraft brake disks may have the oxidation inhibiting composition applied on or proximate stator slots 56, rotor lugs 54, and/or non-wear surface 45.

In various embodiments, method 200 may comprise forming a ceramic layer slurry (step 210). The ceramic layer slurry may comprise aluminum and silicon. The aluminum and silicon may be elemental aluminum and silicon and/or alloys or compounds comprising aluminum and silicon atoms or ions. The aluminum and/or silicon may be in powder form. The aluminum and silicon may be added to a solvent and/or carrier fluid. The solvent and/or carrier fluid may comprise any suitable fluid, such as water, methyltrimethoxysilane (MTMS), hexane, cyclohexane, isopropyl alcohol (or other alcohol), any combination of the foregoing, and/or the like. In various embodiments, the aluminum and silicon may be mixed into the solvent and/or carrier fluid via any suitable method, such as stirring or tumbling. The aluminum and silicon may be mixed into the solvent and/or carrier fluid for any suitable duration. For example, such mixing may take place for under an hour, over an hour, or for multiple hours. In various embodiments the aluminum and silicon may be mixed into the solvent and/or carrier fluid for between two and four hours, for about two hours, or about three hours (the term "about" as used in this context means plus or minus 30 minutes).

In various embodiments, of the aluminum and silicon (collectively, the "solids"), the aluminum may comprise between 10% and 100% by weight, between 10% and 99% by weight, or between 10% and 90% by weight, and the silicon may comprise between 90% and 0% by weight, between 90% and 1% by weight, or between 90% and 10% by weight. In various embodiments, of the aluminum and silicon, the aluminum may comprise about 90% by weight, and the silicon may comprise about 10% by weight (the term "about" in this context means plus or minus 10 weight percent).

In various embodiments, regarding the compositional make up the ceramic layer slurry, the aluminum/silicon solids may comprise between 20% and 80% by weight of the ceramic layer slurry, between 30% and 70% by weight of the ceramic layer slurry, between 40% and 60% by weight of the ceramic layer slurry, or between 40% and 50% by weight of the ceramic layer slurry. In various embodiments, the aluminum/silicon solids may comprise about 40% or about 45% by weight of the ceramic layer slurry (the term "about" in this context means plus or minus 10 weight percent). In various embodiments, the solvent(s) and/or carrier fluid(s) may comprise between 20% and 80% by weight, or between 20% and 90% by weight of the ceramic layer slurry, or about 40% by weight of the ceramic layer slurry (the term "about" in this context means plus or minus 10 weight percent).

In various embodiments, the ceramic layer slurry may further comprise a binder (but in further embodiments, the ceramic layer slurry may not comprise a binder). The binder may comprise any suitable compound, such as silicon oxycarbide, silicon oxycarbide generating sol, silicon oxycarbide pre-ceramic polymer, and/or polyvinyl alcohol. In various embodiments, the binder may comprise between 0.2% and 15% by weight of the ceramic layer slurry, between 5% and 15% by weight of the ceramic layer slurry, or about 10% or about 12% by weight of the ceramic layer slurry (the term "about" in this context means plus or minus 5 weight percent).

In various embodiments, method 200 further comprises applying the ceramic layer slurry to a composite structure (step 220). Applying the ceramic layer slurry may comprise, for example, spraying or brushing the ceramic layer slurry to an outer surface of the composite structure (e.g., a non-wear or non-friction surface). Any suitable manner of applying the ceramic layer slurry to the composite structure is within the scope of the present disclosure. As referenced herein, the composite structure may refer to a carbon-carbon composite structure.

In various embodiments, method 200 may further comprise a step 230 of heating the composite structure to form a ceramic layer. The composite structure may be heated (e.g., dried or baked) at a temperature in the range from about 500° C. (932° F.) to about 1500° C. (2732° F.). In various embodiments, the composite structure may be heated to a temperature in a range from about 500° C. (932° F.) to about 1200° C. (2192° F.), or between about 600° C. (1112° F.) to about 1100° C. (2012° F.). In various embodiments, the composite structure may be heated to, or at least to, about 1000° C. (1832° F.), or to, or at least to, about 600° C. (1112° F.), which may depend on the environment in which the composite structure is being heated (the term "about" in this context means plus or minus 100° C. (212° F.)). Step 230 may, for example, comprise heating the composite structure for a period between about 0.5 hour and about 8 hours, or about three hours or about four hours (the term "about" in this context means plus or minus one hour). The ceramic layer may also be referred to as a coating. The temperature rise may be controlled at a rate that removes water without boiling, and provides temperature uniformity throughout the composite structure.

In various embodiments, step 230 may be performed in an environment comprising nitrogen. The nitrogen may be comprised in a gas, such as nitrogen gas ($N_2$) or ammonia gas ($NH_3$). During the heating, the nitrogen in the surrounding environment may react with the aluminum in the ceramic layer slurry to form aluminum nitride. Therefore, the ceramic layer may comprise aluminum nitride. At elevated temperatures, the silicon may also react with the nitrogen in the surrounding environment, forming silicon nitride. Therefore, the ceramic layer may comprise silicon nitride. Also, in embodiments including a silicon oxycarbide binder in the ceramic layer slurry, the aluminum may react with the silicon oxycarbide to form alumina ($Al_2O_3$) and silicon carbide. The reaction between the aluminum and silicon oxycarbide within the ceramic layer slurry (to form alumina) aids in binding the compounds of the alumina ceramic layer slurry and the resulting ceramic layer to itself, thus strengthening the ceramic layer. Also, the reaction between the aluminum, silicon, silicon oxycarbide, and/or the carbon of the composite structure (forming silicon carbide) aids in binding the ceramic layer to the composite structure.

In various embodiments, in response to being heated in an environment comprising ammonia gas, the substrate may be heated to a temperature of at least 600° C. (1112° F.) or about 600° C. (1112° F.) (the term "about" in this context means plus or minus 100° C. (212° F.)). At such temperatures, the ammonia gas may react with the aluminum in the ceramic layer slurry to form aluminum nitride comprised in the resulting ceramic layer. In such an environment comprising ammonia, silicon may react with ammonia to form silicon nitride at about 900° C. (1652° F.). Thus, in various embodiments, in an ammonia environment, the substrate may be heated to at least 900° C. (1652° F.), or to about 900° C. (1652° F.), to form aluminum nitride and silicon nitride.

In various embodiments, in response to being heated in an environment comprising nitrogen gas (which is less reactive than ammonia), the substrate may be heated to a temperature of at least 900° C. (1652° F.) or about 900° C. (1652° F.) (the term "about" in this context means plus or minus 100° C. (212° F.)). At such temperatures, the nitrogen gas may react with the aluminum in the ceramic layer slurry to form aluminum nitride comprised in the resulting ceramic layer. In such an environment comprising nitrogen gas, silicon may react with nitrogen to form silicon nitride at about 1100° C. (2012° F.). Thus, in various embodiments, in a nitrogen gas environment, the substrate may be heated to at least 1100° C. (2012° F.), or to about 1100° C. (2012° F.), to form aluminum nitride and silicon nitride.

The pressure during heating of the substrate may be atmospheric pressure, or between 5 pascals and 150,000 pascals.

Figure 2B:
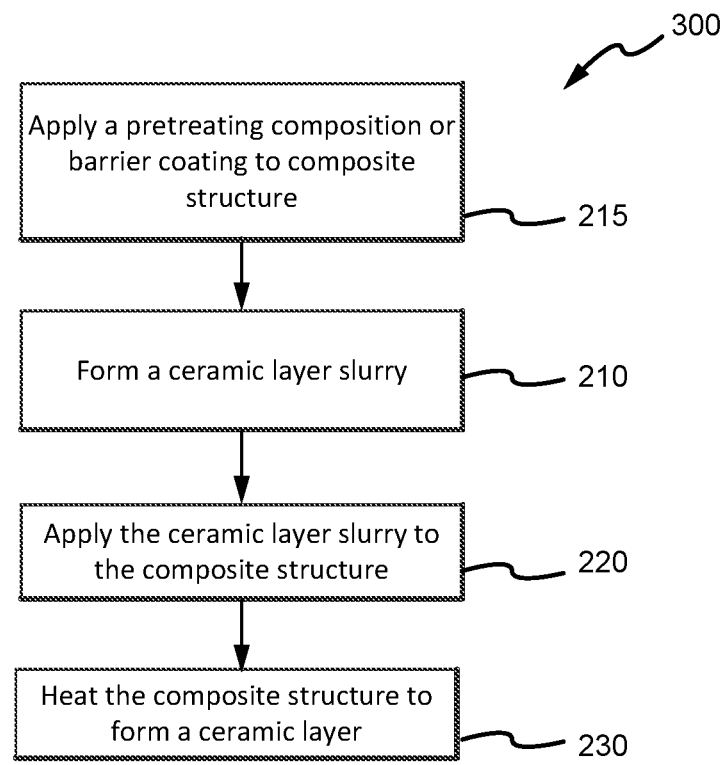

In various embodiments and with reference now to FIG. 2B, method 300, which comprises steps also found in method 200, may further comprise applying at least one of a pretreating composition or a barrier coating (step 215) prior to applying the ceramic layer slurry. Step 215 may, for example, comprise applying a first pretreating composition to an outer surface of a composite structure, such as a component of aircraft wheel braking assembly 10. In various embodiments, the first pretreating composition comprises an aluminum oxide in water. For example, the aluminum oxide may comprise an additive, such as a nanoparticle dispersion of aluminum oxide (for example, NanoBYK-3600®, sold by BYK Additives & Instruments). The first pretreating composition may further comprise a surfactant or a wetting agent. The composite structure may be porous, allowing the pretreating composition to penetrate at least a portion of the pores of the composite structure.

In various embodiments, after applying the first pretreating composition, the component may be heated to remove water and fix the aluminum oxide in place. For example, the component may be heated between about 100° C. (212° F.) and 200° C. (392° F.), and further, between 100° C. (212° F.) and 150° C. (302° F.).

Step 215 may further comprise applying a second pretreating composition. In various embodiments, the second pretreating composition may comprise a phosphoric acid and an aluminum phosphate, aluminum hydroxide, and/or aluminum oxide. The second pretreating composition may further comprise, for example, a second metal salt such as a magnesium salt. In various embodiments, the aluminum to phosphorus molar ratio of the aluminum phosphate is 1 to 3 or less. Further, the second pretreating composition may also comprise a surfactant or a wetting agent. In various embodiments, the second pretreating composition is applied to the composite structure atop the first pretreating composition. The composite structure may then, for example, be heated. In various embodiments, the composite structure may be heated between about 600° C. (1112° F.) and about 800° C. (1472° F.), and further, between about 650° C. (1202° F.) and 750° C. (1382° F.).

In various embodiments, step 215 may comprise applying a barrier coating to an outer surface of a composite structure (alternatively or in addition to the pretreating compositions), such as a component of aircraft wheel braking assembly 10, prior to application of the ceramic layer slurry. In various embodiments, the barrier coating composition may comprise carbides or nitrides, including at least one of a boron nitride, silicon carbide, titanium carbide, boron carbide, silicon oxycarbide, and silicon nitride. In various embodiments, the barrier coating may be a boron compound layer formed from a boron compound slurry. The boron compound slurry may comprise a boron compound comprising boron, such as boron, boron carbide, boron nitride, titanium boride, and a solvent and/or carrier fluid (e.g., water, isopropyl alcohol or another alcohol, hexanes, cyclohexane, and/or the like). In embodiments in which the boron compound comprises boron carbide, the boron carbide may comprise a powder comprising granules having sizes ranging from 0.7 micrometer (2.8×10$^{-5}$ inch) to 5 micrometers (2.0×10$^{-4}$ inch) in size. A boron compound slurry may comprise between 10% and 20% by weight boron compound (e.g., boron carbide), and the remainder comprising solvent and/or carrier fluid. A boron compound slurry may further comprise a dispersant, which may be any suitable dispersant. For example, the dispersant may comprise aluminum oxide (for example, NanoBYK-3600®, sold by BYK Additives & Instruments). A boron compound slurry may comprise less than 1% by weight dispersant.

The boron compound slurry may be applied to the composite structure in any suitable manner (spraying, brushing, etc.) and then dried to form a boron compound layer. In various embodiments, the ceramic layer slurry may be applied to the boron compound layer. In response to heating the composite structure to form the ceramic layer (step 230), the boron compound from the boron compound layer (e.g., boron carbide) may react with the aluminum comprised in the ceramic layer slurry to form aluminum boron carbide. In various embodiments, the ceramic layer resulting from step 230 may comprise aluminum boron carbide. In various embodiments, the ceramic layer may at least partially comprise the boron compound layer, or there may be overlap between the ceramic layer and the boron compound layer.

Figure 2C:
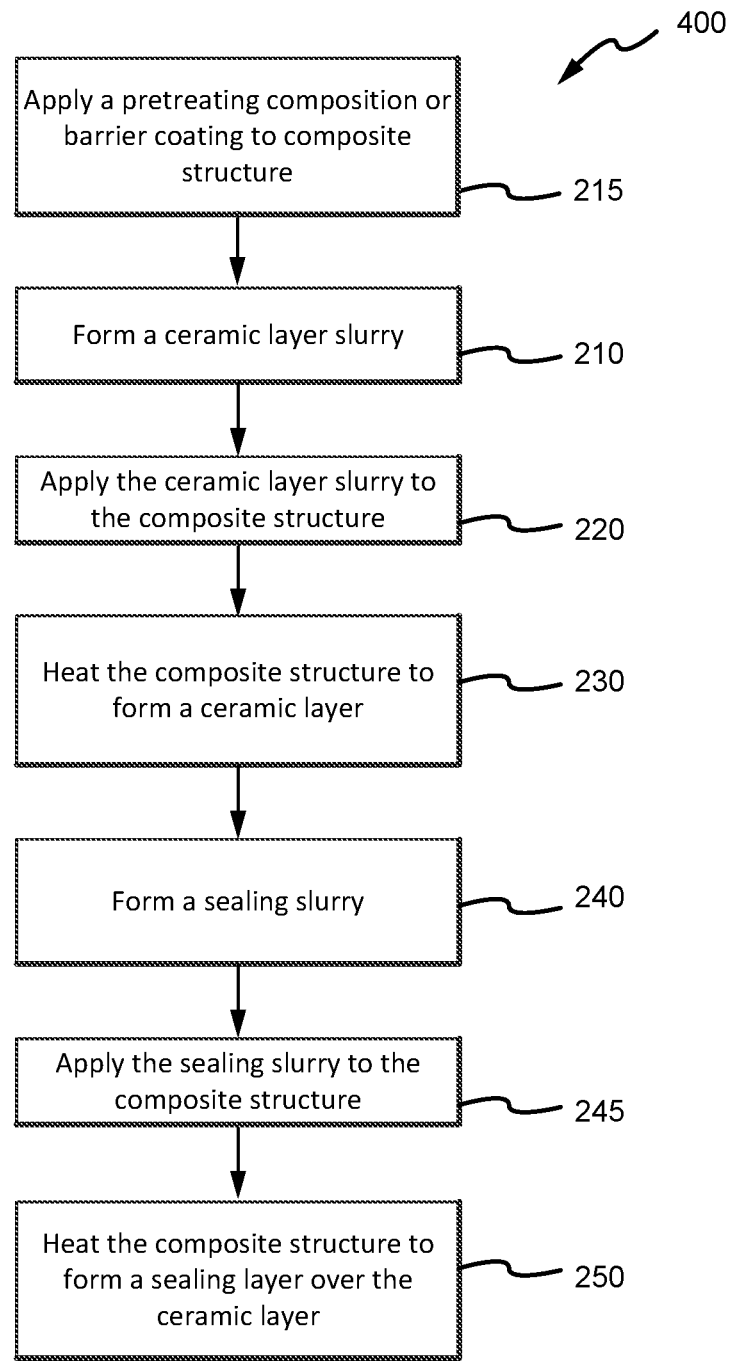

In various embodiments and with reference now to FIG. 2C, method 400 may further comprise a step 240, of forming a sealing slurry by combining a sealing pre-slurry composition, which may comprise a sealing phosphate glass composition in glass frit or powder form, with a carrier fluid (such as, for example, water). In various embodiments, the sealing pre-slurry composition may further comprise ammonium dihydrogen phosphate (ADHP) and/or aluminum orthophosphate. The sealing slurry may be applied to the composite structure (step 245), for example, by spraying or brushing the sealing slurry on to an outer surface of the ceramic layer. Any suitable manner of applying the sealing slurry to the ceramic layer and/or composite structure is within the scope of the present disclosure (e.g., the application methods described in relation to step 220). In various embodiments, the sealing slurry may be substantially free of boron nitride. In this case, "substantially free" means less than 0.01 percent by weight.

In various embodiments, the sealing phosphate glass composition may comprise phosphate glass in the form of a glass frit, powder, or other suitable pulverized and/or ground form, with a carrier fluid (such as, for example, water). The sealing phosphate glass composition may comprise and/or be combined with one or more alkali metal glass modifiers, one or more glass network modifiers and/or one or more additional glass formers. In various embodiments, boron oxide or a precursor may optionally be combined with the $P_2O_5$ mixture to form a borophosphate glass, which has improved self-healing properties at the operating temperatures typically seen in aircraft braking assemblies. In various embodiments, the phosphate glass and/or borophosphate glass may be characterized by the absence of an oxide of silicon. Further, the ratio of $P_2O_5$ to metal oxide in the fused glass may be in the range from about 0.25 to about 5 by weight.

Potential alkali metal glass modifiers may be selected from oxides of lithium, sodium, potassium, rubidium, cesium, and mixtures thereof. In various embodiments, the glass modifier may be an oxide of lithium, sodium, potassium, or mixtures thereof. These or other glass modifiers may function as fluxing agents. Additional glass formers can include oxides of boron, silicon, sulfur, germanium, arsenic, antimony, and mixtures thereof.

Suitable glass network modifiers include oxides of vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof.

The sealing phosphate glass composition may be prepared by combining the above ingredients and heating them to a fusion temperature. In various embodiments, depending on the particular combination of elements, the fusion temperature may be in the range from about 700° C. (1292° F.) to about 1500° C. (2732° F.). The resultant melt may then be cooled and pulverized and/or ground to form a glass frit or powder. In various embodiments, the sealing phosphate glass composition may be annealed to a rigid, friable state prior to being pulverized. Glass transition temperature ($T_g$), glass softening temperature ($T_s$) and glass melting temperature ($T_m$) may be increased by increasing refinement time and/or temperature. Before fusion, the sealing phosphate glass composition comprises from about 20 mol % to about 80 mol % of $P_2O_5$. In various embodiments, the sealing phosphate glass composition comprises from about 30 mol % to about 70 mol % $P_2O_5$, or precursor thereof. In various embodiments, the sealing phosphate glass composition comprises from about 40 to about 60 mol % of $P_2O_5$. In this context, the term "about" means plus or minus 5 mol %.

The sealing phosphate glass composition may comprise, or be combined with, from about 5 mol % to about 50 mol % of the alkali metal oxide. In various embodiments, the sealing phosphate glass composition may comprise, or be combined with, from about 10 mol % to about 40 mol % of the alkali metal oxide. Further, the sealing phosphate glass composition may comprise, or be combined with, from about 15 to about 30 mol % of the alkali metal oxide or one or more precursors thereof. In various embodiments, the sealing phosphate glass composition may comprise, or be combined with, from about 0.5 mol % to about 50 mol % of one or more of the above-indicated glass formers. The sealing phosphate glass composition may comprise, or be combined with, about 5 to about 20 mol % of one or more of the above-indicated glass formers. As used herein, mol % is defined as the number of moles of a constituent per the total moles of the solution.

In various embodiments, the sealing phosphate glass composition may comprise, or be combined with, from about 0.5 mol % to about 40 mol % of one or more of the above-indicated glass network modifiers. The sealing phosphate glass composition may comprise, or be combined with, from about 2.0 mol % to about 25 mol % of one or more of the above-indicated glass network modifiers.

In various embodiments, the sealing phosphate glass composition may be represented by the formula:

$$a(A'_2O)_x(P_2O_5)_{y1}b(G_fO)_{y2}c(A''O)_z \qquad [1]$$

In Formula 1, A' is selected from: lithium, sodium, potassium, rubidium, cesium, and mixtures thereof; $G_f$ is selected from: boron, silicon, sulfur, germanium, arsenic, antimony, bismuth, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.100 to about 0.950; $y_2$ is a number in the range from 0 to about 0.20; and z is a number in the range from about 0.01 to about 0.5; $(x+y_1+y_2+z)=1$; and $x<(y_1+y_2)$. The sealing phosphate glass composition may be formulated to balance the reactivity, durability and flow of the resulting glass base layer for optimal performance. As used in this context, the term "about" means plus or minus ten percent of the respective value.

The sealing slurry may comprise any suitable weight percentage sealing phosphate glass composition. For example, the sealing slurry may comprise between 20% and 50% by weight sealing phosphate glass composition, between 20% and 40% by weight sealing phosphate glass composition, between 20% and 30% by weight sealing phosphate glass composition, and/or between 30% and 40% by weight sealing phosphate glass composition. The sealing pre-slurry composition (and/or the resulting sealing layer, discussed in association with step 250) may comprise any suitable weight percentage sealing phosphate glass composition. For example, the sealing pre-slurry composition may comprise between 50% and 95% by weight sealing phosphate glass composition, between 60% and 90% by weight sealing phosphate glass composition, and/or between 70% and 80% by weight sealing phosphate glass composition.

In various embodiments, method 200 may further comprise a step 250 of heating the composite structure to form a sealing layer comprising phosphate glass over the ceramic layer. The composite structure may be heated (e.g., dried or baked) at a temperature in the range from about 200° C. (292° F.) to about 1000° C. (1832° F.). In various embodiments, the composite structure is heated to a temperature in a range from about 600° C. (1112° F.) to about 1000° C. (1832° F.), or between about 200° C. (292° F.) to about 900° C. (1652° F.), or further, between about 400° C. (752° F.) to about 850° C. (1562° F.). Step 250 may, for example, comprise heating the composite structure for a period between about 0.5 hour and about 8 hours, wherein the term "about" in this context only means plus or minus 0.25 hours. The sealing layer may also be referred to as a coating.

In various embodiments, the composite structure may be heated to a first, lower temperature (for example, about 30° C. (86° F.) to about 400° C. (752° F.)) to bake or dry the sealing layer at a controlled depth. A second, higher temperature (for example, about 300° C. (572° F.) to about 1000° C. (1832° F.)) may then be used to melt the phosphate glass composition, creating a substantially uniform sealing layer over the ceramic layer. The duration of each heating step can be determined as a fraction of the overall heating time and can range from about 10% to about 50%, wherein the term "about" in this context only means plus or minus 5%. In various embodiments, the duration of the lower temperature heating step(s) can range from about 20% to about 40% of the overall heating time, wherein the term "about" in this context only means plus or minus 5%. The lower temperature step(s) may occupy a larger fraction of the overall heating time, for example, to provide relatively slow heating up to and through the first lower temperature. The exact heating profile will depend on a combination of the first temperature and desired depth of the drying portion.

Step 250 may be performed in an inert environment, such as under a blanket of inert gas or less reactive gas (e.g., nitrogen, argon, other noble gases, and the like). For example, a composite structure may be pretreated or warmed prior to application of the sealing slurry to aid in the penetration of the sealing slurry. Step 250 may be for a period of about 2 hours at a temperature of about 600° C. (1112° F.) to about 900° C. (1652° F.), wherein the term "about" in this context only means plus or minus 50° C. The composite structure and the sealing slurry may then be dried or baked in a non-oxidizing, inert or less reactive atmosphere, e.g., noble gasses and/or nitrogen ($N_2$), to optimize the retention of the sealing pre-slurry composition of the sealing slurry and resulting sealing layer filling any pores or cracks in the ceramic layer. This retention may, for example, be improved by heating the composite structure to about 200° C. (392° F.) and maintaining the temperature for about 1 hour before heating the carbon-carbon composite to a temperature in the range described above. The temperature rise may be controlled at a rate that removes water without boiling, and provides temperature uniformity throughout the composite structure.

At elevated operation temperatures of aircraft brake disks (e.g., 760° C. (1400° F.) and above), the ceramic layer may crack, which causes a risk of oxygen penetrating through the oxidation protection system and allowing oxidation of the composite structure. At such elevated temperatures, the sealing layer may melt and/or flow, allowing the sealing layer to fill any cracks that may form in the ceramic layer, thus, sealing the ceramic layer and the oxidation protection system.

In various embodiments, the sealing slurry may comprise an additional metal salt. The cation of the additional metal salt may be multivalent. The metal may be an alkaline earth metal or a transition metal. In various embodiments, the metal may be an alkali metal. The multivalent cation may be derived from a non-metallic element such as boron. The term "metal" is used herein to include multivalent elements such as boron that are technically non-metallic. The metal of the additional metal salt may be an alkaline earth metal such as calcium, magnesium, strontium, barium, or a mixture of two or more thereof. The metal for the additional metal salt may be iron, manganese, tin, zinc, or a mixture of two or more thereof. The anion for the additional metal salt may be an inorganic anion such as a phosphate, halide, sulfate or nitrate, or an organic anion such as acetate. In various embodiments, the additional metal salt may be an alkaline earth metal salt such as an alkaline earth metal phosphate. In various embodiments, the additional metal salt may be a magnesium salt such as magnesium phosphate. In various embodiments, the additional metal salt may be an alkaline earth metal nitrate, an alkaline earth metal halide, an alkaline earth metal sulfate, an alkaline earth metal acetate, or a mixture of two or more thereof. In various embodiments, the additional metal salt may be magnesium nitrate, magnesium halide, magnesium sulfate, or a mixture of two or more thereof. In various embodiments, the additional metal salt may comprise: (i) magnesium phosphate; and (ii) a magnesium nitrate, magnesium halide, magnesium sulfate, or a mixture of two or more thereof.

The additional metal salt may be selected with reference to its compatibility with other ingredients in the sealing slurry. Compatibility may include metal phosphates that do not precipitate, flocculate, agglomerate, react to form undesirable species, or settle out prior to application of the sealing slurry to the carbon-carbon composite. The phosphates may be monobasic ($H_2PO_4^-$), dibasic ($HPO_4^{-2}$), or tribasic ($PO_4^{-3}$). The phosphates may be hydrated. Examples of alkaline earth metal phosphates that may be used include calcium hydrogen phosphate (calcium phosphate, dibasic), calcium phosphate tribasic octahydrate, magnesium hydrogen phosphate (magnesium phosphate, dibasic), magnesium phosphate tribasic octahydrate, strontium hydrogen phosphate (strontium phosphate, dibasic), strontium phosphate tribasic octahydrate and barium phosphate.

In one embodiment, a chemical equivalent of the additional metal salt may be used as the additional metal salt. Chemical equivalents include compounds that yield an equivalent (in this instance, an equivalent of the additional metal salt) in response to an outside stimulus such as, temperature, hydration, or dehydration. For example, equivalents of alkaline earth metal phosphates may include alkaline earth metal pyrophosphates, hypophosphates, hypophosphites and orthophosphites. Equivalent compounds include magnesium and barium pyrophosphate, magnesium and barium orthophosphate, magnesium and barium hypophosphate, magnesium and barium hypophosphite, and magnesium and barium orthophosphite.

While not wishing to be bound by theory, it is believed that the addition of multivalent cations, such as alkaline earth metals, transition metals and nonmetallic elements such as boron, to the sealing slurry enhances the hydrolytic stability of the metal-phosphate network. In general, the hydrolytic stability of the metal-phosphate network increases as the metal content increases, however a change from one metallic element to another may influence oxidation inhibition to a greater extent than a variation in the metal-phosphate ratio. The solubility of the phosphate compounds may be influenced by the nature of the cation associated with the phosphate anion. For example, phosphates incorporating monovalent cations such as sodium orthophosphate or phosphoric acid (hydrogen cations) are very soluble in water, while (tri)barium orthophosphate is insoluble. Phosphoric acids can be condensed to form networks but such compounds tend to remain hydrolytically unstable. Generally, it is believed that the multivalent cations link phosphate anions creating a phosphate network with reduced solubility. Another factor that may influence hydrolytic stability is the presence of —P—O—H groups in the condensed phosphate product formed from the sealing slurry during thermal treatment. The sealing slurry may be formulated to minimize concentration of these species and any subsequent hydrolytic instability. Whereas increasing the metal content may enhance the hydrolytic stability of the sealing slurry, it may be desirable to strike a balance between composition stability and effectiveness as an oxidation inhibitor.

In various embodiments, the additional metal salt may be present in the sealing slurry at a concentration in the range from about 0.5 weight percent to about 30 weight percent, and in various embodiments from about 0.5 weight percent to about 25 weight percent, and in various embodiments from about 5 weight percent to about 20 weight percent. In various embodiments, a combination of two or more additional metal salts may be present at a concentration in the range from about 10 weight percent to about 30 weight percent, and in various embodiments from about 12 weight percent to about 20 weight percent.

Figure 3:
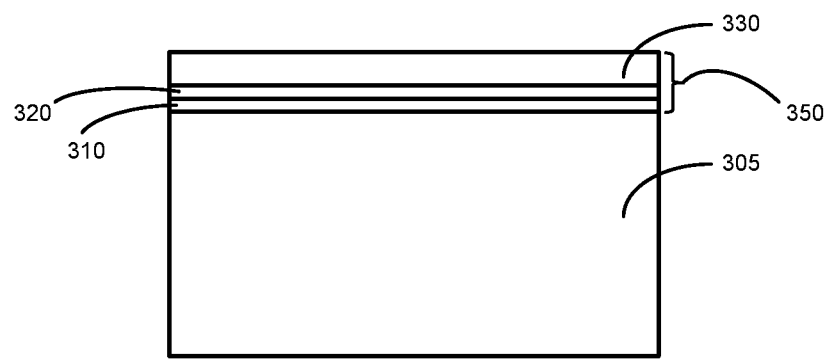
FIG. 3 illustrates a substrate comprising an oxidation protection system disposed thereon, accordance with various embodiments.

FIG. 3 depicts a substrate 305 (e.g., a composite structure) with an oxidation protection system 350 disposed thereon (e.g., on a non-wear or non-friction surface). In accordance with various embodiments, the oxidation protection system on a substrate may comprise a ceramic layer (e.g., layer 320). The ceramic layer may be directly disposed on and in contact with the substrate. In various embodiments, an oxidation protection system may comprise a layer(s) between the substrate 305 and the ceramic layer, for example, layer 310. Layer 310 may comprise a pretreating layer(s) or a barrier coating (e.g., a boron compound layer), as discussed herein. In various embodiments, an oxidation protection system may comprise a sealing layer (e.g., layer 330). The sealing layer may be disposed on, and directly contact, the ceramic layer, such that the ceramic layer is disposed between the sealing slurry and the substrate.

TABLE 1 illustrates a sealing slurry prepared in accordance with the embodiments discussed herein. Each numerical value in TABLE 1 is the number of grams of the particular substance added to the slurry.

TABLE 1

| Example >> | A |
|---|---|
| $H_2O$ | 52.4 |
| Ammonium dihydrogen phosphate (ADHP) | 11.33 |
| Glass frit | 34 |
| Aluminum orthophosphate (o-$AlPO_4$) | 2.27 |

As illustrated in TABLE 1, an oxidation protection system sealing slurry (slurry A) comprises a pre-slurry composition, comprising phosphate glass composition glass frit and various additives such as aluminum orthophosphate, and/or ammonium dihydrogen phosphate, in a carrier fluid (i.e., water), was prepared. Slurry A may be a suitable sealing slurry which will serve as a sealing layer after heating (such as during step 250), which is substantially free of boron nitride. In this case, "substantially free" means less than 0.01 percent by weight.

Figure 4:
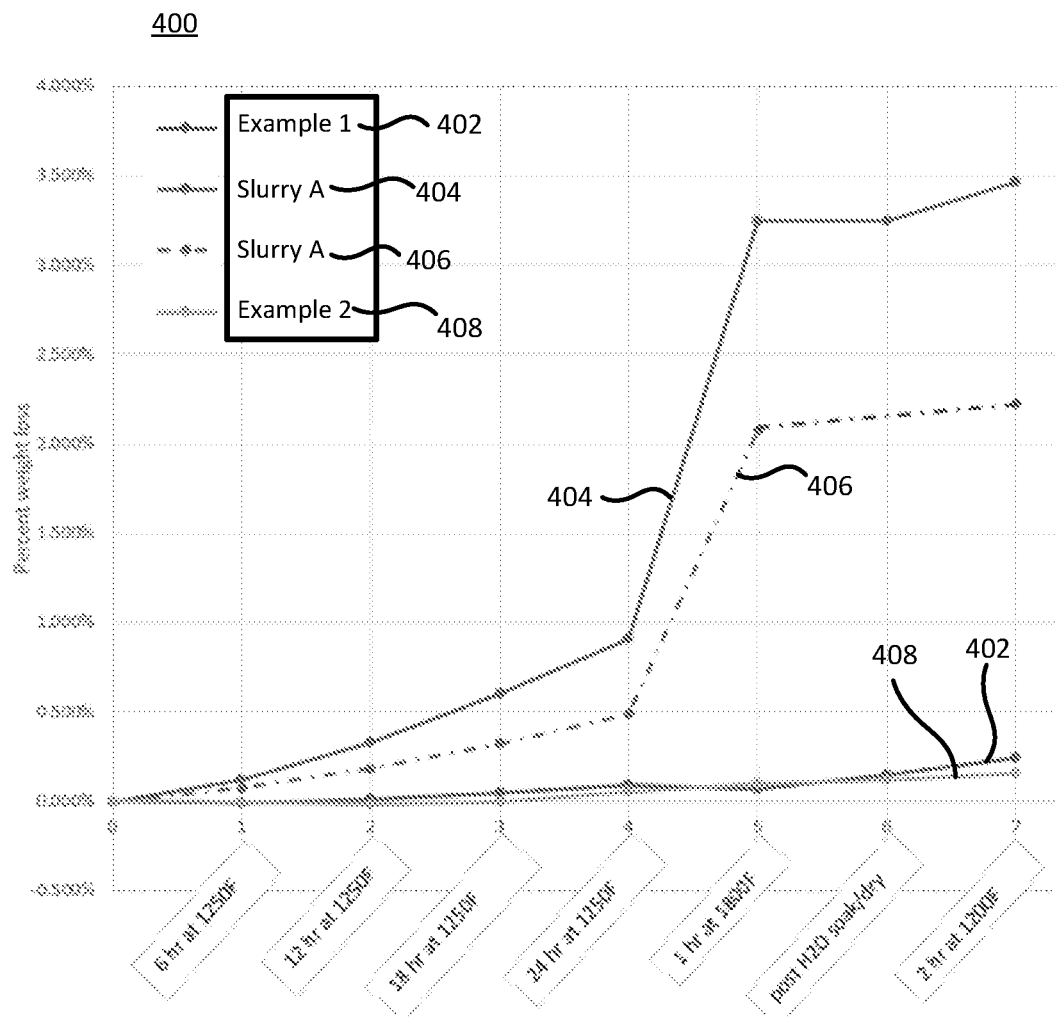
FIG. 4 illustrates experimental data obtained from testing various oxidation protection systems, in accordance with various embodiments.

With combined reference to TABLE 1 and FIG. 4, TABLE 1 and plot 400 in FIG. 4 may allow evaluation of oxidation protection systems comprising a ceramic layer and a sealing layer versus oxidation protection systems comprising and a sealing layer without a ceramic layer. Data sets 402 and 408 represent oxidation protection systems comprising a ceramic layer and a sealing layer, while data sets 404 and 406 represent oxidation protection systems comprising a sealing layer (resulting from slurry A) without a ceramic layer. Percent weight loss is shown on the y-axis and exposure time is shown on the x-axis of the graph depicted in FIG. 4.

The oxidation protection systems represented by data sets 404 and 406 were prepared by applying slurry A to carbon-carbon composite coupons and heated to form a sealing slurry, in accordance with embodiments discussed herein. Slurry A for data set 404 is hydrated, while the slurry A for data set 406 is not (i.e., dry). Example 1, represented by data set 402, was prepared by: (1) applying a boron compound slurry comprising 14 grams of boron carbide, 86 grams of water, and 0.2 grams of dispersant to a carbon-carbon composite coupon, by dipping the coupon in the boron compound slurry; (2) air-drying the boron compound slurry to form a boron compound layer on the coupon; (3) preparing a ceramic layer slurry comprising 16.76 grams of MTMS, 41.57 grams of water, 4.32 grams of sub-micron silicon powder, and 37.35 grams of 30-micron aluminum powder; (4) applying the ceramic layer slurry to the boron compound layer by dipping the coupon in the ceramic layer slurry; (5) air-drying the ceramic layer slurry; (6) heating the coupon at 1040° C. (1904° F.) for about three hours under an environment comprising nitrogen gas to form the ceramic layer comprising at least aluminum nitride; (7) applying slurry A to the ceramic layer; and (8) heating the coupon at 870° C. (1598° F.) to melt the phosphate glass in the sealing slurry and form the sealing layer. Example 2, represented by data set 408, was prepared by the same method as Example 1 (data set 402), except to form the ceramic layer, the coupon was heated at 940° C. (1724° F.) rather than at 1040° C. (1904° F.), as in Example 1. The coupons were then heated in accordance with the time and temperature milestones shown on the x-axis of FIG. 4. The milestone (1-7) along the x-axis of FIG. 4 are sequential (i.e., they happen one after the other).

As can be seen in FIG. 4, the oxidation protection systems having the ceramic layer and the sealing layer (data sets 402 and 408) resulted in drastically less weight loss of the composite structure than the oxidation protection systems having a sealing layer with no ceramic layer (data sets 404 and 406). That is, oxidation protection systems having the ceramic layer and the sealing layer (data sets 402 and 408) resulted in about 0.25% weight loss of the substrate at the end of the test, while the oxidation protection systems having a sealing layer with no ceramic layer (data sets 404 and 406) resulted in about 3.5% and 2.5% weight loss, respectively. Thus, oxidation protection systems having the ceramic layer and the sealing layer (data sets 402 and 408) provided about (or at least) ten times the oxidation protection than the oxidation protection systems having the ceramic layer and the sealing layer (data sets 402 and 408). These results indicate that the oxidation protection systems comprising the ceramic layer (comprising aluminum nitride, silicon, silicon nitride, aluminum boron carbide, and/or silicon carbide), along with the sealing layer disposed thereon, creates a strong barrier which stops oxygen from passing therethrough and causing oxidation of the underlying substrate (especially at elevated temperatures of 1800° F.). The economical preparation and application of the involved slurries, along with the positive and improved oxidation protection results, indicate that the systems and methods discussed herein provide effective oxidation protection.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming an oxidation protection system on a composite structure, comprising:
   applying a ceramic layer slurry to the composite structure, wherein the ceramic layer slurry comprises (i) at least one of elemental aluminum or an alloy of aluminum, and (ii) at least one of elemental silicon or an alloy of silicon, in a solvent or carrier fluid;
   heating the composite structure to above 1000° C. in an environment comprising nitrogen gas to form a ceramic layer on the composite structure, wherein the at least one of the elemental aluminum or the alloy of aluminum reacts with the nitrogen gas such that, as a result, the ceramic layer comprises aluminum nitride;
   applying a sealing slurry to the composite structure, wherein the sealing slurry comprises a sealing pre-slurry composition and a sealing carrier fluid, wherein the sealing pre-slurry composition comprises a sealing phosphate glass composition; and
   heating the composite structure to form a sealing layer on the composite structure.

2. The method of claim 1, further comprising preparing the ceramic layer slurry by combining aluminum powder and silicon powder in the solvent or carrier fluid.

3. The method of claim 1, wherein the ceramic layer is disposed between the sealing layer and the composite structure.

4. The method of claim 1, further comprising preparing the sealing slurry by combining the sealing pre-slurry composition with the sealing carrier fluid.

5. The method of claim 1, wherein the ceramic layer further comprises silicon nitride from reaction between the at least one of the elemental silicon or the alloy of silicon with the nitrogen gas.

6. The method of claim 1, further comprising applying a boron compound slurry to the composite structure prior to the applying the ceramic layer slurry to the composite structure; and allowing the boron compound slurry to dry on the composite structure to form a boron compound layer.

7. The method of claim 6, wherein the boron compound slurry comprises boron carbide, and wherein the ceramic layer further comprises aluminum boron carbide.

8. The method of claim 1, wherein the ceramic layer slurry further comprises silicon oxycarbide.

9. The method of claim 8, wherein the ceramic layer further comprises alumina and silicon carbide.

10. The method of claim 1, wherein the (i) at least one of the elemental aluminum or the alloy of aluminum, and (ii) the at least one of the elemental silicon or the alloy of silicon, together, comprise between 40% and 50% by weight of the ceramic layer slurry.

11. The method of claim 1, wherein, of the (i) at least one of the elemental aluminum or the alloy of aluminum, and (ii) the at least one of the elemental silicon or the alloy of silicon, together, the aluminum comprises between 10% and 99% by weight, and the silicon comprises between 90% and 1% by weight.

12. The method of claim 1, wherein the sealing phosphate glass composition is represented by the formula $a(A'_2O)_x(P_2O_5)_{y1}b(G_fO)_{y2}c(A''O)_z$:

A' is selected from: lithium, sodium, potassium, rubidium, cesium, and mixtures thereof;

$G_f$ is selected from: boron, silicon, sulfur, germanium, arsenic, antimony, and mixtures thereof;

A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof;

a is a number in the range from 1 to about 5;

b is a number in the range from 0 to about 10;

c is a number in the range from 0 to about 30;

x is a number in the range from about 0.050 to about 0.500;

$y_1$ is a number in the range from about 0.100 to about 0.950;

$y_2$ is a number in the range from 0 to about 0.20; and z is a number in the range from about 0.01 to about 0.5;

$(x+y_1+y_2+z)=1$; and $x< (y_1+y_2)$.

* * * * *